(12) United States Patent
McCann et al.

(10) Patent No.: US 9,313,759 B2
(45) Date of Patent: Apr. 12, 2016

(54) METHODS, SYSTEMS, AND COMPUTER READABLE MEDIA FOR PROVIDING TRIGGERLESS EQUIPMENT IDENTITY REGISTER (EIR) SERVICE IN A DIAMETER NETWORK

(71) Applicant: Tekelec, Inc., Morrisville, NC (US)

(72) Inventors: Thomas Matthew McCann, Raleigh, NC (US); Mark Edward Kanode, Apex, NC (US)

(73) Assignee: Tekelec, Inc., Morrisville, NC (US)

( * ) Notice: Subject to any disclaimer, the term of this patent is extended or adjusted under 35 U.S.C. 154(b) by 168 days.

(21) Appl. No.: 13/751,027

(22) Filed: Jan. 25, 2013

(65) Prior Publication Data

US 2013/0171990 A1   Jul. 4, 2013

Related U.S. Application Data (63) Continuation-in-part of application No. 12/906,998, filed on Oct. 18, 2010, now Pat. No. 8,613,073.

(60) Provisional application No. 61/252,557, filed on Oct. 16, 2009.

(51) Int. Cl.
*H04L 29/06* (2006.01)
*H04W 60/00* (2009.01)
(Continued)

(52) U.S. Cl.
CPC ........... *H04W 60/00* (2013.01); *H04L 63/0263* (2013.01); *H04L 63/0892* (2013.01); *H04W 8/04* (2013.01); *H04W 12/06* (2013.01)

(58) Field of Classification Search
CPC . H04L 63/0263; H04L 63/0892; H04W 8/04; H04W 60/00; H04W 12/06
USPC .............................................. 726/2–3, 11–13
See application file for complete search history.

(56) References Cited

U.S. PATENT DOCUMENTS

| 4,310,727 A | 1/1982 | Lawser |
| 4,754,479 A | 6/1988 | Bicknell et al. |

(Continued)

FOREIGN PATENT DOCUMENTS

| CN | 1968267 A | 5/2007 |
| EP | 0 512 962 A2 | 11/1992 |

(Continued)

OTHER PUBLICATIONS

3GPP, Technical Specification 29.272 V8.4.0, Sep. 2009, 71 pages.*

(Continued)

*Primary Examiner* — Mohammad A Siddiqi
(74) *Attorney, Agent, or Firm* — Jenkins, Wilson, Taylor & Hunt, P.A.

(57) ABSTRACT

The subject matter described herein includes methods, systems, and computer readable media for providing triggerless EIR service in a Diameter network. One method includes steps performed at a Diameter routing agent (DRA). The steps include, receiving a registration or authentication information request at the DRA. The steps further include performing, by the DRA, an EIR lookup in response to the registration or authentication information request message. The method further includes, relaying the registration or authentication information request message to a home subscriber server (HSS) or a home location register (HLR) or responding on behalf of the HSS or HLR based on results of the EIR lookup.

24 Claims, 8 Drawing Sheets

(51) Int. Cl.
*H04W 12/06* (2009.01)
*H04W 8/04* (2009.01)

(56) References Cited

U.S. PATENT DOCUMENTS

| | | |
|---|---|---|
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,353,331 A | 10/1994 | Emery et al. |
| 5,396,543 A | 3/1995 | Beeson, Jr. et al. |
| 5,400,390 A | 3/1995 | Salin |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,583,914 A | 12/1996 | Chang et al. |
| 5,590,398 A | 12/1996 | Matthews |
| 5,594,942 A | 1/1997 | Antic et al. |
| 5,623,532 A | 4/1997 | Houde et al. |
| 5,664,005 A | 9/1997 | Emery et al. |
| 5,689,548 A | 11/1997 | Maupin et al. |
| 5,706,286 A | 1/1998 | Reiman et al. |
| 5,711,002 A | 1/1998 | Foti |
| 5,805,997 A | 9/1998 | Farris |
| 5,819,177 A | 10/1998 | Vucetic et al. |
| 5,819,178 A | 10/1998 | Cropper |
| 5,822,694 A | 10/1998 | Coombes et al. |
| 5,832,382 A | 11/1998 | Alperovich |
| 5,845,211 A | 12/1998 | Roach, Jr. |
| 5,850,604 A | 12/1998 | Dufour et al. |
| 5,854,982 A | 12/1998 | Chambers et al. |
| 5,862,481 A | 1/1999 | Kulkarni et al. |
| 5,878,347 A | 3/1999 | Joensuu et al. |
| 5,878,348 A | 3/1999 | Foti |
| 5,890,063 A | 3/1999 | Mills |
| 5,920,820 A | 7/1999 | Qureshi et al. |
| 5,953,662 A | 9/1999 | Lindquist et al. |
| 5,953,663 A | 9/1999 | Maupin et al. |
| 5,978,672 A | 11/1999 | Hartmaier et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,137,869 A | 10/2000 | Voit et al. |
| 6,138,016 A | 10/2000 | Kulkarni et al. |
| 6,138,017 A | 10/2000 | Price et al. |
| 6,138,023 A | 10/2000 | Agarwal et al. |
| H1921 H | 11/2000 | Fletcher et al. |
| 6,144,857 A | 11/2000 | Price et al. |
| 6,148,204 A | 11/2000 | Urs et al. |
| 6,178,181 B1 | 1/2001 | Glitho |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,411,632 B2 | 6/2002 | Lindgren et al. |
| 6,424,832 B1 | 7/2002 | Britt et al. |
| 6,434,144 B1 | 8/2002 | Romanov |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,594,258 B1 | 7/2003 | Larson et al. |
| 6,606,491 B1 | 8/2003 | Peck |
| 6,611,516 B1 | 8/2003 | Pirkola et al. |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,735,441 B1 | 5/2004 | Turgeon et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,701 B1 | 9/2004 | Baker et al. |
| 6,836,477 B1 | 12/2004 | West, Jr. et al. |
| 6,839,421 B2 | 1/2005 | Ferraro Esparza et al. |
| 6,871,070 B2 | 3/2005 | Ejzak |
| 6,917,612 B2 | 7/2005 | Foti et al. |
| 6,950,441 B1 | 9/2005 | Kaczmarczyk et al. |
| 7,027,582 B2 | 4/2006 | Khello et al. |
| 7,035,239 B2 | 4/2006 | McCann et al. |
| 7,079,524 B2 | 7/2006 | Bantukul et al. |
| 7,079,853 B2 | 7/2006 | Rathnasabapathy et al. |
| 7,170,982 B2 | 1/2007 | Li et al. |
| 7,221,952 B2 | 5/2007 | Cho et al. |
| 7,996,541 B2 | 8/2011 | Marathe et al. |
| 8,340,711 B1 | 12/2012 | Glass et al. |
| 8,613,073 B2 | 12/2013 | McCann et al. |
| 2001/0030957 A1 | 10/2001 | McCann et al. |
| 2001/0040957 A1 | 11/2001 | McCann et al. |
| 2002/0147845 A1 | 10/2002 | Sanchez-Herrero et al. |
| 2002/0173320 A1 | 11/2002 | Aitken et al. |
| 2003/0007482 A1 | 1/2003 | Khello et al. |
| 2003/0026289 A1 | 2/2003 | Mukherjee et al. |
| 2003/0081754 A1 | 5/2003 | Esparza et al. |
| 2003/0109271 A1 | 6/2003 | Lewis et al. |
| 2003/0193967 A1 | 10/2003 | Fenton et al. |
| 2003/0220951 A1 | 11/2003 | Muthulingam et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0246965 A1 | 12/2004 | Westman et al. |
| 2005/0239441 A1 | 10/2005 | Eronen |
| 2006/0002308 A1 | 1/2006 | Na et al. |
| 2006/0002400 A1 | 1/2006 | Kenyon et al. |
| 2006/0067338 A1 | 3/2006 | Hua et al. |
| 2006/0136557 A1 | 6/2006 | Schaedler et al. |
| 2007/0061397 A1 | 3/2007 | Gregorat et al. |
| 2007/0083470 A1 | 4/2007 | Bonner et al. |
| 2007/0115934 A1 | 5/2007 | Dauster et al. |
| 2007/0116250 A1 | 5/2007 | Stafford |
| 2007/0275718 A1* | 11/2007 | Descombes et al. ........ 455/435.1 |
| 2008/0167035 A1* | 7/2008 | Buckley et al. ............ 455/435.1 |
| 2008/0247526 A1 | 10/2008 | Qiu et al. |
| 2008/0281975 A1 | 11/2008 | Qiu et al. |
| 2008/0311917 A1 | 12/2008 | Marathe et al. |
| 2009/0221265 A1 | 9/2009 | Liu et al. |
| 2010/0177780 A1 | 7/2010 | Ophir et al. |
| 2011/0116382 A1* | 5/2011 | McCann et al. .............. 370/241 |
| 2011/0126277 A1 | 5/2011 | McCann et al. |
| 2012/0039312 A1* | 2/2012 | Narkar et al. ................ 370/338 |

(56) References Cited

U.S. PATENT DOCUMENTS

| | | | |
|---|---|---|---|
| 2013/0155948 | A1 | 6/2013 | Pinheiro et al. |
| 2014/0181952 | A1 | 6/2014 | McCann et al. |
| 2014/0273968 | A1 | 9/2014 | Agarwal et al. |

FOREIGN PATENT DOCUMENTS

| | | | |
|---|---|---|---|
| EP | 0 936 825 A3 | 8/1999 | |
| EP | 0 944 276 A1 | 9/1999 | |
| EP | 1 308 054 B1 | 3/2004 | |
| EP | 1 285 545 B1 | 10/2004 | |
| EP | 1 247 378 B1 | 5/2005 | |
| KR | 10-2004-0107271 A | 12/2004 | |
| WO | WO 95/12292 A1 | 5/1995 | |
| WO | WO 96/11557 | 4/1996 | |
| WO | WO 97/33441 A1 | 9/1997 | |
| WO | WO 98/56195 | 12/1998 | |
| WO | WO 99/11087 A2 | 3/1999 | |
| WO | 99/57926 | 11/1999 | |
| WO | WO 00/16583 A1 | 3/2000 | |
| WO | WO 00/35153 | 6/2000 | |
| WO | WO 00/35155 | 6/2000 | |
| WO | WO 00/35156 | 6/2000 | |
| WO | WO 01/47297 A2 | 6/2001 | |
| WO | WO 01/48981 A1 | 7/2001 | |
| WO | WO 02/11462 A2 | 2/2002 | |
| WO | WO 2004/006534 A1 | 1/2004 | |
| WO | WO 2004/075507 A2 | 9/2004 | |
| WO | WO 2007/045991 A1 | 4/2007 | |
| WO | WO 2008/157213 A2 | 12/2008 | |
| WO | WO 2009/070179 A1 | 6/2009 | |

OTHER PUBLICATIONS

3GPP, Technical Specification 29.305 V8.0.0, Dec. 2008, 53 pages.*
Third Office Action for Chinese Application No. 200880103119.4 (Aug. 19, 2013).
Notice of Allowance and Fee(s) Due for U.S. Appl. No. 12/906,998 (Jul. 31, 2013).
Second Office Action for Chinese Application No. 200880103119.4 (Mar. 19, 2013).
Commonly-assigned, co-pending U.S. Appl. No. 61/784,694 for "Methods, Systems, and Computer Readable Media for Providing a Multi-Network Equipment Identity Register," (Unpublished, filed Mar. 14, 2013).
Non-Final Office Action for U.S. Appl. No. 12/906,998 (Jan. 2, 2013).
First Official Action for Chinese Patent Application No. 200880101339.4 (Jul. 4, 2012).
Final Official Action for U.S. Appl. No. 12/906,998 (Mar. 29, 2012).
Non-Final Official Action for U.S. Appl. No. 12/906,998 (Sep. 21, 2011).
Notice of Allowance and Fee(s) Due for U.S. Appl. No. 11/888,907 (Apr. 1, 2011).
"Ericsson Unified Number Portability," (Downloaded from the Internet on Jan. 24, 2011).
Official Action for U.S. Appl. No. 11/888,907 (Sep. 16, 2010).
Tsou et al., "Realm-Based Redirection in Diameter," draft-ietf-dime-realm-based-redirect-03, RFC 3588, pp. 1-6 (Jul. 12, 2010).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0. pp. 1-129 (Mar. 2010).
Korhonen et al., "Clarifications on the Routing of Diameter Requests Based on the Username and the Realm," RFC 5729, pp. 1-9 (Dec. 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.4.0, pp. 1-71 (Sep. 2009).
Notification of Transmittal of the International Search Report and the Written Opinion of the International Searching Authority, or the Declaration for International Application No. PCT/US2008/066675 (Dec. 9, 2008).
"3rd Generation Partnership Project; Technical Specification Group Services and System Aspects; Policy and charging control architecture (Release 8)," 3GPP TS 23.203, V8.1.1, pp. 1-87 (Mar. 2008).
Notice of Allowance for U.S. Appl. No. 10/729,519 (Jul. 30, 2007).
"IP Multimedia Subsystem," printout from wikipedia.org, Wikimedia Foundation, Inc. (May 29, 2007).
Official Action for U.S. Appl. No. 10/729,519 (Nov. 28, 2006).
"HP OpenCall Home Subscriber Server Software—Data Sheet", 4AA0-3360ENW Rev. 2, Hewlett-Packard Development Company, L.P. (Jul. 2006).
Supplemental Notice of Allowance for U.S. Appl. No. 09/747,070 (Feb. 10, 2006).
Tschofenig et al., "Securing the Next Steps in Signaling (NSIS) Protocol Suite," International Journal of Internet Protocol Technology, vol. 1, pp. 1-14 (2006).
Notice of Allowance for U.S. Appl. No. 09/747,070 (Dec. 2, 2005).
Interview Summary for U.S. Appl. No. 09/747,070 (Dec. 2, 2005).
Advisory Action for U.S. Appl. No. 09/747,070 (Nov. 1, 2005).
Stiemerling et al., "NAT/Firewall NSIS Signaling Layer Protocol (NSLP)," draft-ietf-nsis-nslp-natfw-06, pp. 1-70 (May 16, 2005).
Final Official Action for U.S. Appl. No. 09/747,070 (May 11, 2005).
Schwarz, "ENUM Trial to Link Phone, Internet Addresses," (Mar. 22, 2005).
Peterson, "Telephone Number Mapping (ENUM) Service Registration for Presence Services," Network Working Group, RFC 3953 (Jan. 2005).
Notice of Opposition for European Application No. 01959313.6 (Dec. 3, 2004).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Notice of Allowance for U.S. Appl. No. 09/471,946 (Oct. 15, 2004).
Official Action for U.S. Appl. No. 09/747,070 (Jun. 30, 2004).
Peterson et al., "Using E.164 Numbers With the Session Initiation Protocol (SIP)," Network Working Group, RFC 3824, pp. 1-14 (Jun. 2004).
Supplemental Notice of Allowability for U.S. Appl. No. 09/471,946 (May 24, 2004).
Decision to Grant a European Patent Pursuant to Article 97(2) EPC for European Application No. 01959313.6 (Jan. 26, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Notice of Allowance and Fee(s) Due for U.S. Appl. No. 09/471,946 (Feb. 6, 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Notice of Allowance and Fee(s) Due for U.S. Appl. No. 09/626,590 (Dec. 22, 2003).

(56) References Cited

OTHER PUBLICATIONS

Interview Summary for U.S. Appl. No. 09/471,946 (Dec. 9, 2003).
Communication pursuant to Article 96(2) EPC for European Application No. 00988270.5 (Nov. 12, 2003).
Office Communication for U.S. Appl. No. 09/759,743 (Oct. 20, 2003).
Calhoun et al., "Diameter Base Protocol," RFC 3588, pp. 1-90 (Sep. 2003).
Communication under Rule 51(4) EPC for European Application No. 01959313.6 (Aug. 19, 2003).
Official Action for U.S. Appl. No. 09/471,946 (Jul. 9, 2003).
Moodie, "Agilent acceSS7: White Paper," Agilent Technologies, pp. 1-14 (Apr. 1, 2003).
Notice of Allowance and Fee(s) Due for U.S. Appl. No. 09/759,743 (Mar. 10, 2003).
Non-Final Office Action for U.S. Appl. No. 09/626,590 (Mar. 7, 2003).
Interview Summary for U.S. Appl. No. 09/759,743 (Feb. 27, 2003).
Foster et al., "Number Portability in the Global Switched Telephone Network (GSTN): An Overview," Network Working Group, RFC 3482 (Feb. 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Loshin, "19.4: Network Address Translation," TCP/IP Clearly Explained, Fourth Edition, Morgan Kaufman Publishers, pp. 435-437 (2003).
Final Official Action for U.S. Appl. No. 09/759,743 (Dec. 2, 2002).
Barry, "A Signal for Savings," Packet, Cisco Systems Users Magazine, vol. 14, No. 4, pp. Cover; 19-21; and 81 (Fourth Quarter 2002).
Notification of Transmittal of International Preliminary Examination Report for International Application No. PCT/US01/23833 (Oct. 18, 2002).
Interview Summary for U.S. Appl. No. 09/759,743 (Sep. 13, 2002).
Official Action for U.S. Appl. No. 09/759,743 (May 23, 2002).
Interview Summary for U.S. Appl. No. 09/759,743 (Mar. 6, 2002).
"Global Implementation of ENUM: A Tutorial Paper," International Telecommunication Union, Telecommunication Standardization Union, Study Group 2, (Feb. 8, 2002).
Notification of Transmittal of the International Search Report for International Application No. PCT/US01/23833 (Jan. 31, 2002).
"Agilent Technologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
Notification of Transmittal of International Preliminary Examination Report for International Application No. PCT/US1999/030861 (Dec. 28, 2001).
Official Action for U.S. Appl. No. 09/759,743 (Dec. 3, 2001).
International Preliminary Examination Report for International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001-Printed in the UK Nov. 30, 2001).
International Search Report for International Application No. PCT/US00/34924 (May 16, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Mealling, "The Naming Authority Pointer (NAPTR) DNS Resource Record," Network Working Group, RFC 2915 (Sep. 2000).
Rockhold, "Or," Wireless Review, p. 22, 23, 26, 28, 30, 32, (Aug. 15, 2000).
Notification of Transmittal of the International Search Report or the Declaration for International Application No. PCT/US1999/030861 (Mar. 17, 2000).
"IP7 Secure Gateway Release 1.0," 910-2046-01 Revision A, pp. 1-66 (Nov. 1999).
Hamdi et al., "Voice Service Interworking for PSTN and IP Networks," IEEE Communications Magazine, pp. 104-111 (May 1999).
"Topsail Beach-SS7 Over IP-" Cisco Systems, Inc., pp. 1-16 (Copyright 1999).
"Feature Guide, LNP / LSMS," P/N 910-1598-01, Revision A, pp. 1-112 (Jan. 1998).
"Eagle Feature Guide," P/N 910-1225-01, Revision B, pp. 1-218 (Jan. 1998).
"Information, Network Element, Home Location Register Authentication Center," A30808-X3245-X32-1-7618, Siemens AG, pp. 1-80 (1998).
"Information, Network Element, Mobile-Services Switching Center/ Visitor Location Register," A30808-X3245-X31-1-7618, Siemens AG, pp. 1-98 (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
"Information, Signalling, Overview CCNC," A30808-X2769-X7-3-7618, Siemens AG, pp. 1-38 (1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signalling Requirements for Number Portability," AT&T Network Systems, No. 1, p. 1-75, (Feb. 2, 1996).
"Information, Network Element, Mobile-Service Switching Center Visitor Location Register," A30808-X3245-X17-1-7618, Siemens AG, pp. 1-92 (1996).
ETSI, Digital Cellular Telecommunications System (Phase 2+); Mobile Application Part (MAP) Specification, Global System for Mobile Communications, pp. 112-114 (1996).
Jain, et al., "A Hashing Scheme for Phone Number Portabilirt in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN und intelligente Netze," Zeichengabesystem, Medien-Institut Bremen, p. iz-xi; 170-176, (Feb. 17, 1995).
"Information, Signalling, Overview CCNC," A30808-X2769-X6-1-7618, Siemens AG, pp. 1-62 (1995).
"Information, Network Element, Equipment Identity Register," A30808-X3245-X19-1-7618, Siemens AG, pp. 1-34 (1995).
"Information, Network Element, Home Location Register Authentication Center," A30808-X3245-X18-1-7618, Siemens AG, pp. 1-80 (1995).
Giordano et al., "PCS Number Portability," IEEE, p. 1146-1150, (Sep. 1994).

(56) References Cited

OTHER PUBLICATIONS

Bellcore, "Signalling Transfer Point (STP) Generic Requirements," Bell Communications Research, No. 1, p. ii-xxii, 4-84-J14, (Jun. 1994).

Telcordia Technologies, "CCS Network Interface Specification (CCSNIS) Supporting SCCP and TCAP,"Bell Communications Research, p. ii-xii, 1-1—C-22, (Mar. 1994).

Buckles, "Very High Capacity Signaling Trnsfer Point for Intelligent Network Servcies," DSC Communciations Corporation, p. 1308-1311, (1988).

"Diameter Overview," referenced from www.ulticom.com/html/products/signalware-diameter-reference-guide.asp (Publication Date Unknown).

"Chapter 1: Overview," SS7 Port Adapter Installation and Configuration, pp. 1-1-1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.294)MB12, pp. 6.5-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and Sua SS7 Over IP Signaling Gateways," IP Transfer Point, Cisco IOS Release 12.2(4)MB10, pp. 49-62 (Publication Date Unknown).

"3rd Generation Partnership Project; Technical Specification Group Services and System Aspects; General Packet Radio Service (GPRS); Service description; Stage 2 (Release 11)," 3GPP TS 23.060, V11.4.0, pp. 1-335 (Dec. 2012).

Communication pursuant to Article 94(3) EPC for European Application No. 08 770 806.1 (Aug. 6, 2014).

Final Office Action for Chinese Application No. 200880103119.4 (Dec. 4, 2013).

Extended European Search Report for European Application No. 08770806.1 (Dec. 2, 2013).

3rd Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401, V12.0.0, pp. 1-290 (Mar. 2013).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 11)," 3GPP TS 29.272, V11.5.0, pp. 1-119 (Dec. 2012).

"3rd Generation Partnership Project; Technical Specification Group Services and System Aspects; IP Multimedia Subsystem (IMS); Stage 2 (Release 8)," 3GPP TS 23.228, V8.1.0 (Jun. 2007).

Non-Final Office Action for U.S. Appl. No. 14/212,291 (Apr. 10, 2015).

Decision to Grant a European Patent pursuant to Article 97(1) EPC for European Patent Application No. 08770806.1 (May 4, 2015).

Communication under Rule 71(3) EPC for European Patent Application No. 08770806.1 (Mar. 3, 2015).

Communication pursuant to Article 94(3) EPC for European Patent Application No. 08770806.1 (Oct. 10, 2014).

\* cited by examiner

METHODS, SYSTEMS, AND COMPUTER READABLE MEDIA FOR PROVIDING TRIGGERLESS EQUIPMENT IDENTITY REGISTER (EIR) SERVICE IN A DIAMETER NETWORK

PRIORITY CLAIM

This application is a continuation-in-part of U.S. patent application Ser. No. 12/906,998, filed Oct. 18, 2010, which claims the benefit of U.S. Provisional Patent Application Ser. No. 61/252,557, filed Oct. 16, 2009.

TECHNICAL FIELD

The subject matter described herein relates to providing EIR service in a Diameter network. More particularly, the subject matter described herein includes methods, systems, and computer readable media for providing triggerless equipment identity register (EIR) service in a Diameter network.

BACKGROUND

In telecommunications networks, the EIR is a database that stores access control information for mobile devices. In particular, the EIR is a database of mobile device identifiers, typically international mobile equipment identifiers (IMEIs), and access control rules for the IMEIs. When a device attempts to access the network, the mobility management entity (MME), serving GPRS support node (SGSN), or mobile switching center/visitor location registrar (MSC/VLR) queries the EIR to determine whether the IMEI associated with the mobile device is permitted to access the network. The EIR responds indicating whether or not the mobile device is permitted to access the network.

The Third Generation Partnership Project (3GPP) defines the S13 and S13' interfaces for accessing an EIR in long term evolution (LTE) networks. In SS7 networks, the SGSN accesses the EIR via a Gf interface, and the MSC/VLR accesses the EIR via a mobile application part (MAP)/F interface. The S13, S13', Gf, and MAP/F interfaces are triggered interfaces that require a query from the MME, SGSN, or MSC/VLR to the EIR and a response from the EIR to the querying node. A triggered interface means that the MME, SGSN, or MSC/VLR is required to be configured with software, referred to as a trigger, that upon activation of a mobile device on a network, queries the EIR, waits for the response, and determines whether the mobile device is permitted to access the network based on the response from the EIR database. Requiring the MME, SGSN, or MSC/VLR to have a triggered interface for EIR database access increases the complexity of MME, SGSN, or MSC/VLR design and can also delay call processing.

Accordingly, there exists a need for methods, systems, and computer readable media for providing triggerless equipment identity register (EIR) service in a Diameter network.

SUMMARY

The subject matter described herein includes methods, systems, and computer readable media for providing triggerless EIR service in a Diameter network. One method includes steps performed at a Diameter routing agent (DRA). The steps include receiving a registration or authentication information request message at the DRA. The steps further include performing, by the DRA, an EIR lookup in response to the registration or authentication information request message. The method further includes, relaying the registration or authentication information request message to a home subscriber server (HSS) or a home location register (HLR) or responding on behalf of the HSS or HLR based on results of the EIR lookup.

Because a DRA according to embodiments of the subject matter described herein may be configured to perform triggerless EIR service in response to a received Diameter update location request (ULR), Diameter authentication information request (AIR), SS7 location update message, or other non-EIR message, the term "registration or authentication information request message" will be used herein to refer to any one or more of these and/or other non-EIR message types.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

The subject matter described herein includes methods, systems, and computer readable media for providing triggerless EIR service in a Diameter network. By "triggerless" it is meant that an SGSN or MME, or other node is not required to be configured with a trigger to perform an EIR lookup over the S13, S13', or other EIR interface. Instead, a Diameter routing agent receives a Diameter ULR, AIR, or other non-EIR message from the SGSN, MME, or other node and performs the EIR lookup based on the received non-EIR message, eliminating the need for an MME, SGSN, MSC/VLR, or other switching office trigger.

Figure 1:
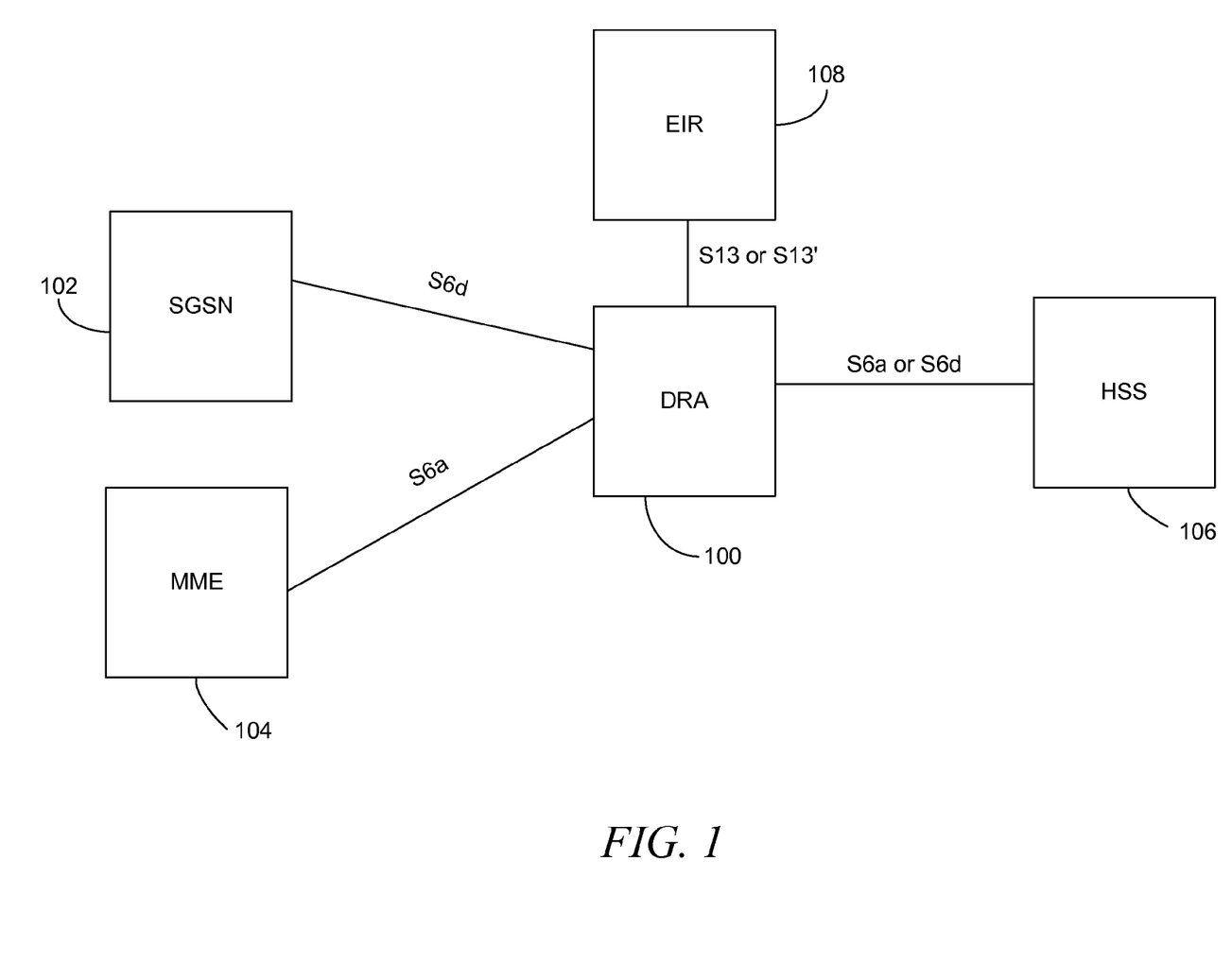
FIG. 1 is a block diagram illustrating an exemplary system for providing triggerless EIR service in a Diameter network according to an embodiment of the subject matter described herein.

FIG. 1 is a block diagram illustrating an exemplary system for providing triggerless EIR service in a Diameter network according to an embodiment of the subject matter described herein. Referring to FIG. 1, a Diameter routing agent (DRA) 100 resides on the S6a or S6d interface between SGSN 102 or MME 104 and home subscriber server (HSS) 106. DRA 100 may be a network node that routes Diameter signaling messages based on Diameter routing information. DRA 100 may also be referred to as a Diameter signaling router (DSR). DRA 100 is configured to perform lookups in an EIR database 108 in response to Diameter messages received from SGSN 102 or MME 104. EIR database 108 may be internal to DRA 100 or external to DRA 100. If EIR 108 is external, DRA 100 may be coupled to EIR 108 via an S13 or S13' interface, an SS7 interface, or a proprietary interface. EIR database 108, whether internal or external to DRA 100, may store access control information for mobile devices, such as long term evolution (LTE) devices.

Figure 2:
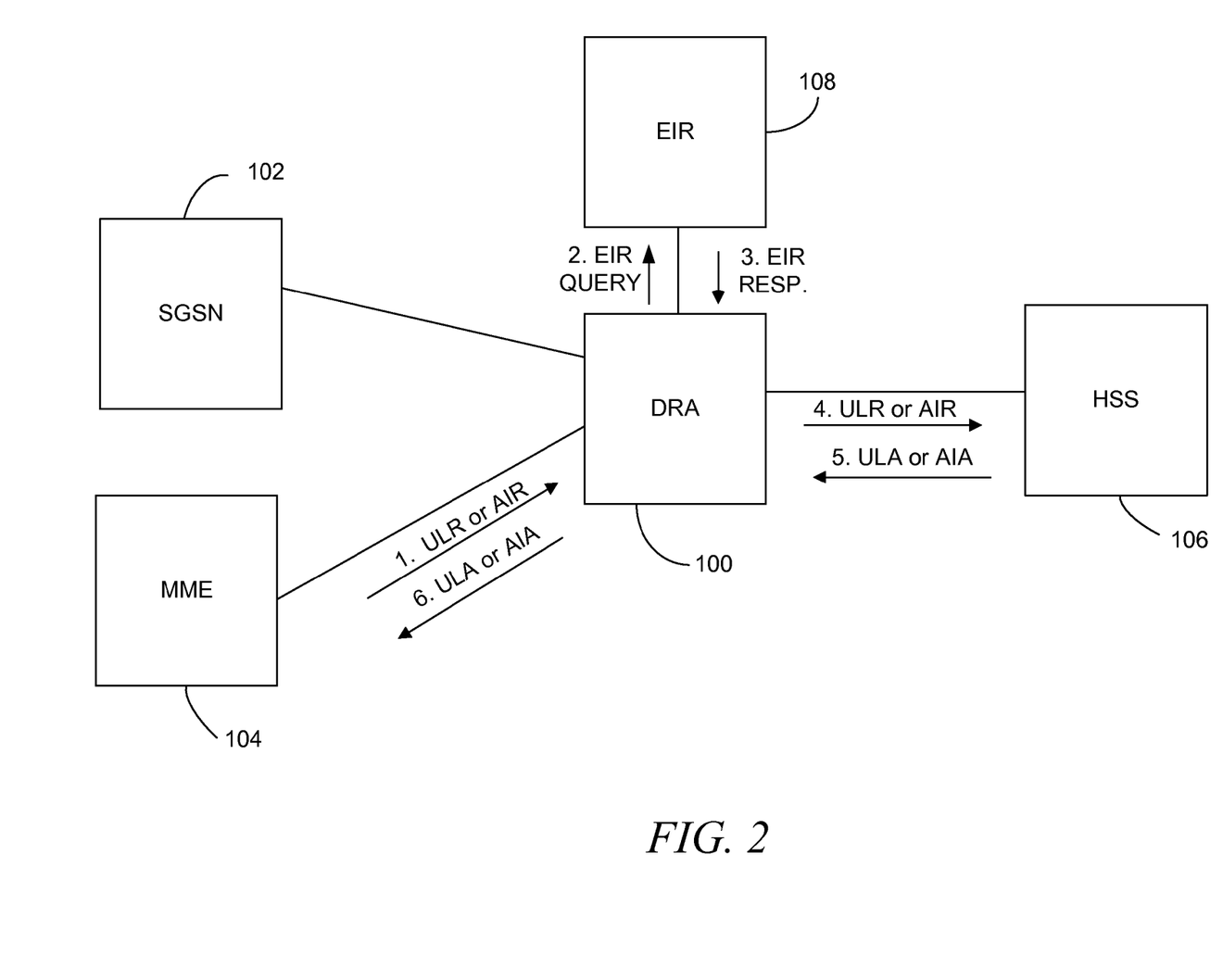
FIG. 2 is a network diagram illustrating triggerless EIR service where network access is allowed according to an embodiment of the subject matter described herein.

In one exemplary implementation as illustrated in FIG. 2, DRA 100 receives a ULR or AIR message from SGSN 102 or MME 104. The ULR or AIR message may be addressed to HSS 106, and DRA 100 may intercept the ULR or AIR message. In response to the ULR or AIR message, DRA 100 performs a lookup in EIR 108 and receives a response from EIR 108. The lookup in the EIR database may be performed based on the IMEI and optional IMSI. The IMEI may be inserted in the ULR or AIR message by the SGSN 102 or MME 104. The IMEI is not typically included in the ULR or AIR message. Accordingly SGSN 102 or MME 104 may be provisioned to insert the IMEI in an extension or experimental field of the ULR or AIR. Alternatively, for some types of phones, such as fifth generation iPhones®, where there is no SIM card or the SIM card is not removable, the mapping between the IMEI and the IMSI is fixed. If the mapping between the IMEI and the IMSI is fixed, the ULR or AIR message may omit the IMEI and may only contain the IMSI. DRA 100 may store or have access to a database that maps IMSIs to IMEIs for such devices. DRA 100 may map the IMSI to the IMEI and perform the EIR lookup based on the IMEI and optional IMSI.

EIR 108 implements device access authorization functions, such as determining whether a particular device or user equipment is stolen and whether it is allowed to access the network. If the result of the lookup in EIR 108 is that the access to the network by the device is allowed, DRA 100 may relay the ULR or AIR message to HSS 106. This case is illustrated in FIG. 2. In the message flow illustrated in FIG. 2, in step 1, MME 104 sends a ULA or AIA message to DRA 100. In step 2, DRA 100 performs a lookup in EIR database 108. In step 3, EIR database 108 responds indicating that access to the network is allowed. In step 4, DRA 100 relays the ULR or AIR message to HSS 106. In step 5, HSS 106 forwards a ULA or AIA message to MME 104 via DRA 100.

Figure 3:
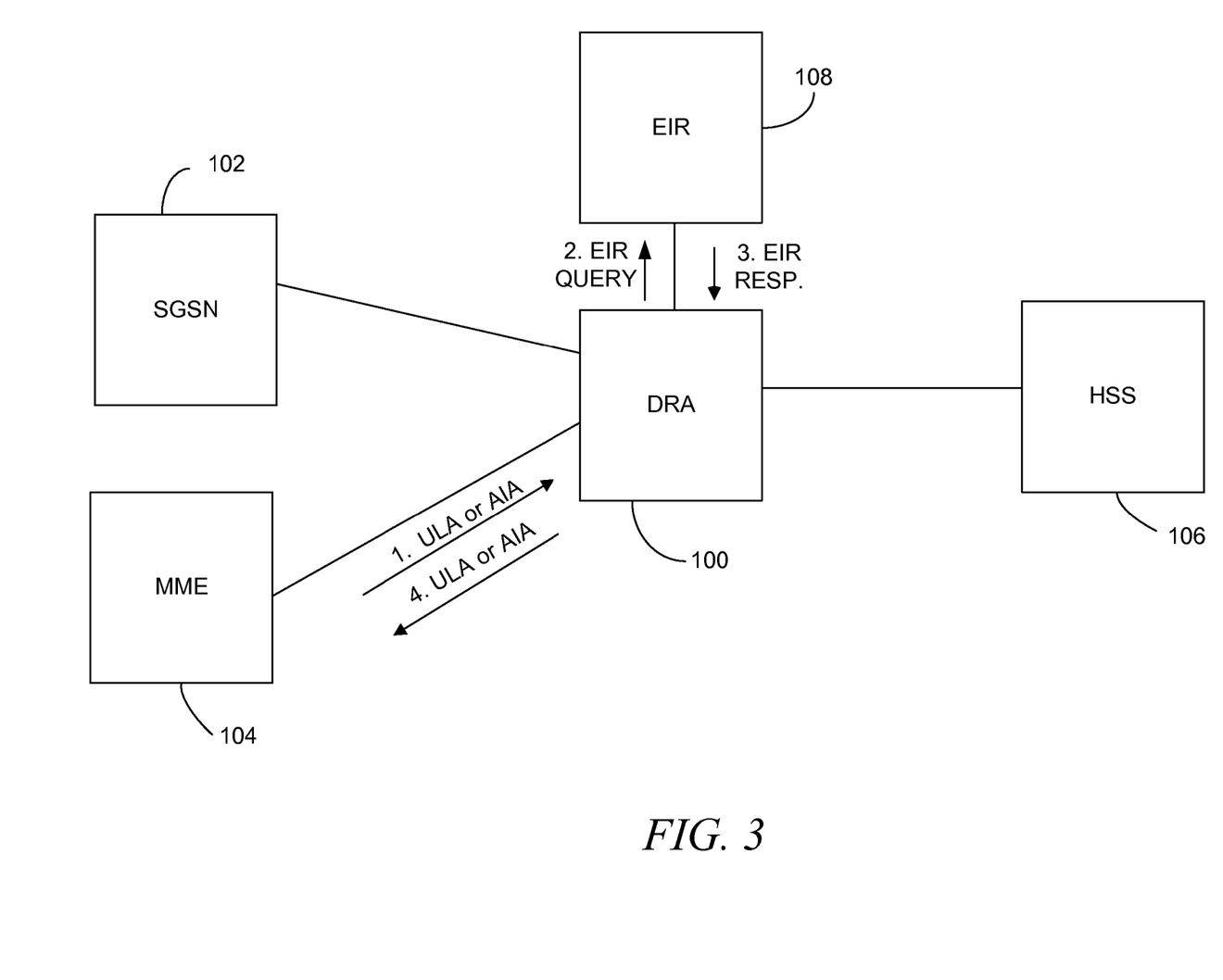
FIG. 3 is a network diagram illustrating triggerless EIR service where network access is blocked according to an embodiment of the subject matter described herein.

FIG. 3 is a network diagram similar to FIG. 2 where DRA 100 responds on behalf of HSS 106 when the result of the EIR lookup is that network access is blocked. Referring to FIG. 3, in step 1, MME 104 sends a ULA or AIA message to HSS 106 via DRA 100. In step 2, DRA 100 queries EIR 108 to determine whether access to the network is allowed. In step 3, EIR 108 responds indicating that access to the network is not allowed. In step 4, DRA 100 responds on behalf of HSS 106 by sending a ULA or AIA message to MME 104 indicating that network access is not allowed. By "responding on behalf of HSS 106", it is meant that DRA 100 formulates the ULA or AIA message and transmits the ULA or AIA message to MME 104 or SGSN 102 without forwarding the ULR or AIR message to HSS 106. The ULA or AIA message may include an existing experimental result code or a new experimental result code that indicates that access to the network by the device identified by the IMEI is blocked. If the received message is a ULR message, the response may be a ULA message with a flag value that indicates that the access is blocked.

Figure 4:
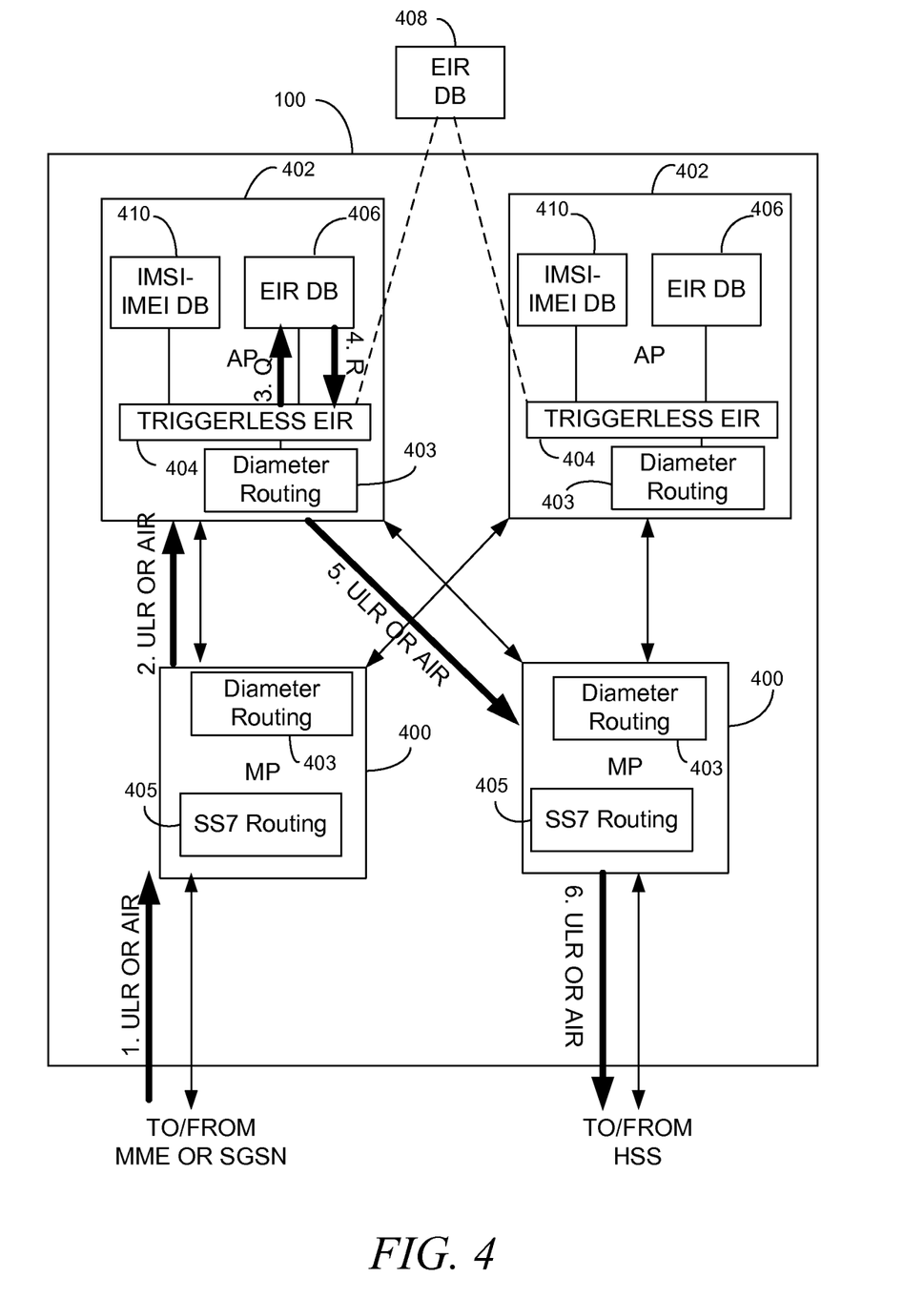
FIG. 4 is a block diagram illustrating an exemplary DRA for providing triggerless EIR service where network access is allowed according to an embodiment of the subject matter described herein.

FIG. 4 is a block diagram illustrating an exemplary internal architecture for DRA 100 that provides triggerless EIR services according to an embodiment of the subject matter described herein. In FIG. 4, DRA 100 includes a plurality of message processors 400 that perform Diameter routing functions. For example, each message processor 400 may route Diameter signaling messages based on Diameter routing information. DRA 100 may also include one or more application processors 402 that perform application functions. Each of message processors 400 and application processors 402 may include Diameter routing modules 403 for routing received Diameter signaling messages. Message processors 400 may also include SS7 routing modules 405 for routing SS7 messages based on SS7 information.

In one embodiment, application processors 402 may be configured to query an internal or external EIR database. As such, application processor 402 includes a triggerless EIR module 404 for performing an internal or external EIR lookup in internal EIR database 406 or external EIR database 408. In addition, each triggerless EIR module 404 may also have access to an IMSI to IMEI database 410 that stores mappings between IMSIs and IMEIs for phones without SIM cards where the mappings between IMSIs and IMEIs are fixed. If the EIR database is external and connected via a Diameter S13 or S13' interface, each triggerless EIR module 404 may access the external EIR database using a Diameter-based EIR query sent over the S13 or S13' interface. If the EIR database is external and connected via an SS7 network interface, such as an SS7 Gf, MAP/F or other interface, each triggerless EIR module 404 may formulate an SS7-based EIR query.

In step 1 in FIG. 4, a message processor 400 receives a ULR or AIR message and identifies the message as one that requires an EIR lookup. Accordingly, in step 2, message processor 400 forwards the message to application processor 402. In steps 3 and 4, triggerless EIR module 404 accesses internal or external EIR database 406 or 408 and determines whether or not the subscriber is allowed to access the network. If the equipment is allowed to access the network, in step 5, triggerless EIR module 404 relays the ULR or AIR message to a message processor 400 associated with the HSS so that the message will be forwarded to the HSS. In step 6, egress message processor 400 forwards the ULR or AIR to the HSS. If the equipment is not permitted to access the network, triggerless EIR function responds on behalf of the HSS with a ULA or AIA message indicating that the access is not allowed.

Figure 5:
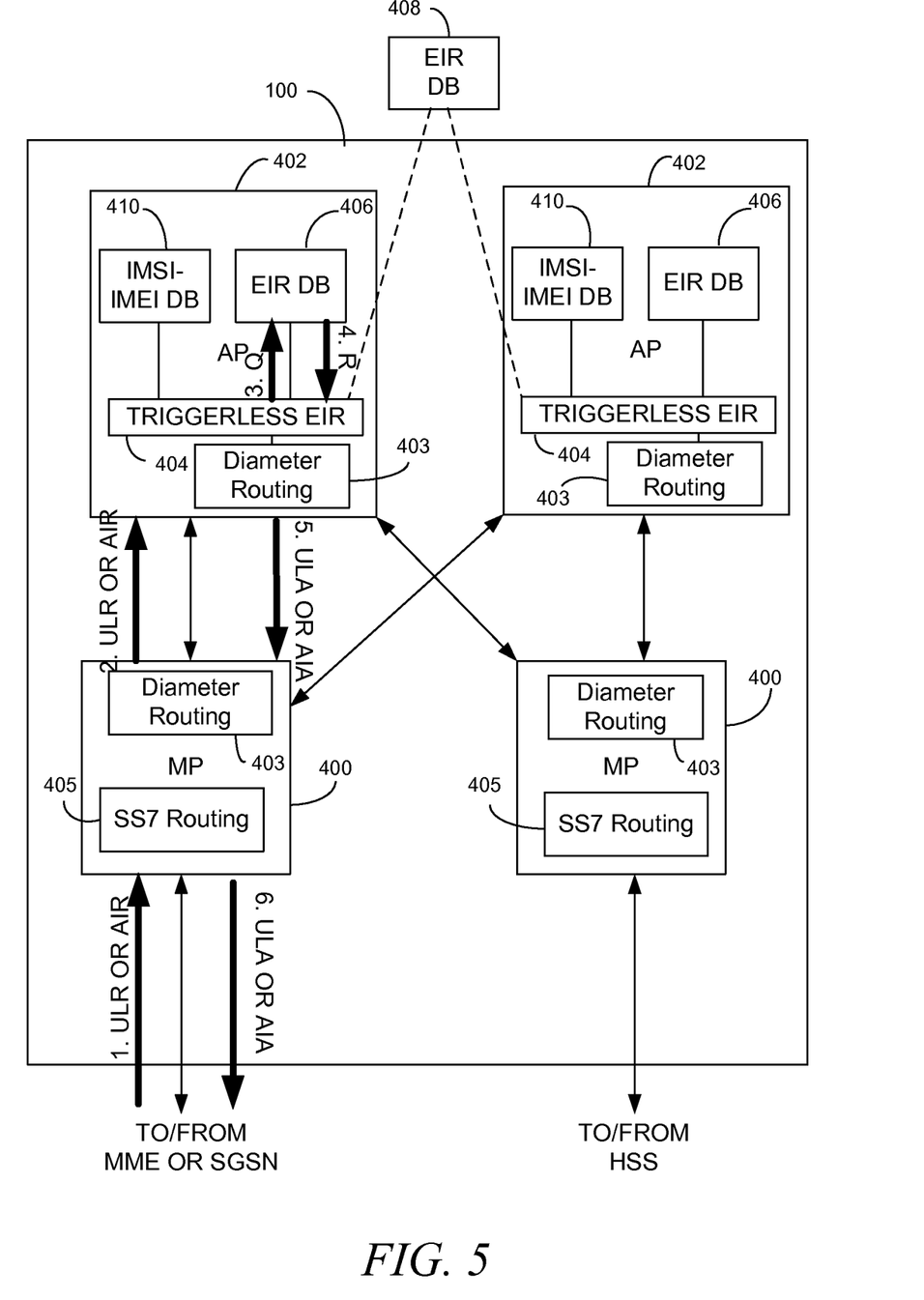
FIG. 5 is a block diagram illustrating an exemplary DRA for providing triggerless EIR service where network access is blocked according to an embodiment of the subject matter described herein.

FIG. 5 is a block diagram illustrating the message flow through DRA 100 for the case where DRA 100 responds on behalf of HSS 106 according to an embodiment of the subject matter described herein. Referring to FIG. 5, in step 1, a ULR AIR message is received at message processor 104. In step 2, message processor 400 forwards the ULR or AIR message to application processor 402. In steps 3 and 4, application processor 402 queries EIR database 406 to determine whether access is allowed. In this instance, it is determined that access is not allowed. Accordingly, in step 5, triggerless EIR module 404 formulates a ULA or AIA message indicating that access is not allowed and forwards the message the egress message processor 400. In step 6, egress message processor 400 forwards the ULA or AIA message to the MME or the SGSN.

Figure 6:
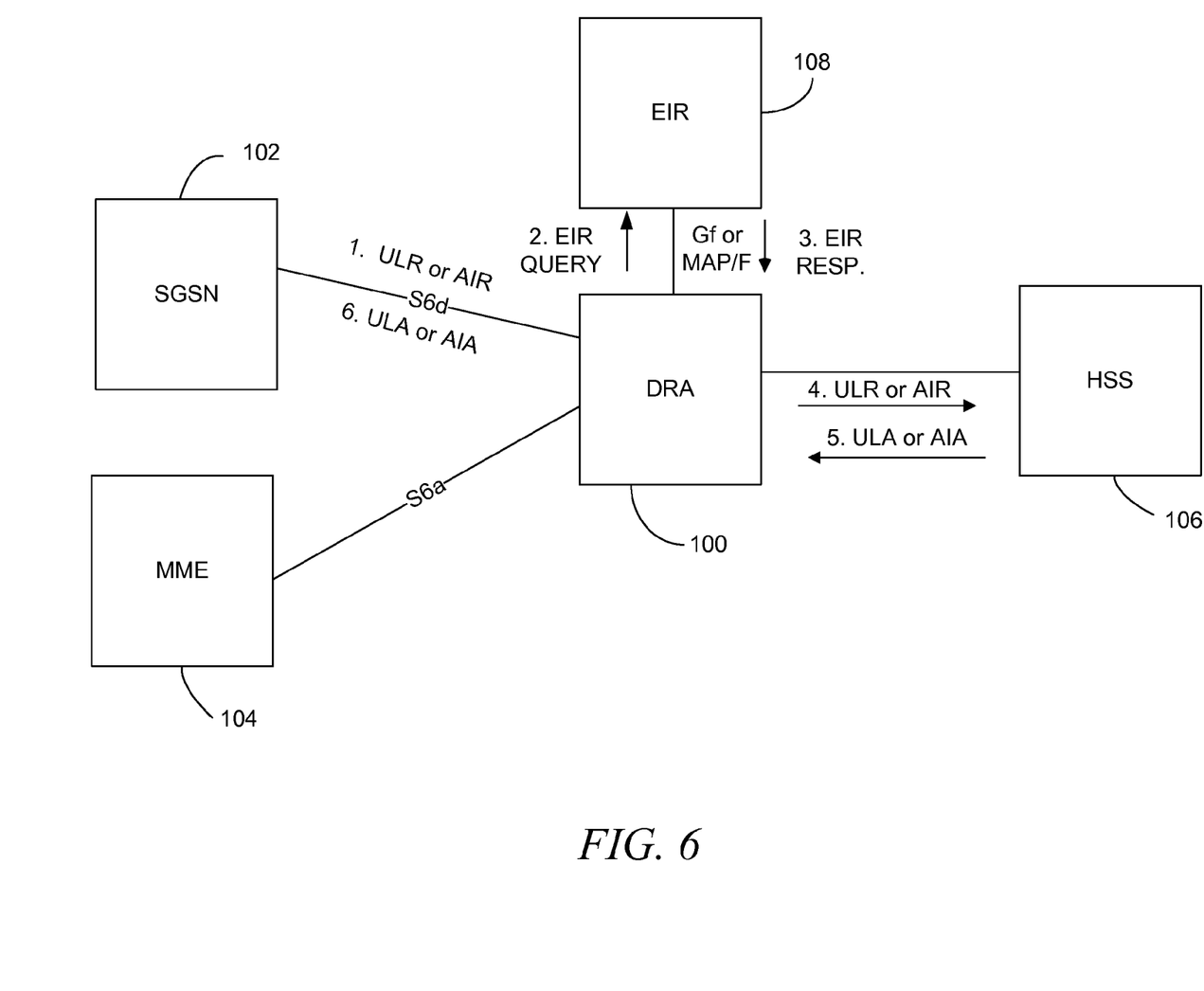
FIG. 6 is a network diagram illustrating an exemplary network architecture for using a DRA with an SS7 connected EIR to provide triggerless EIR service according to an embodiment of the subject matter described herein.

In some of the examples described above, the EIR is queried on the S13 or S13' interface in response to received ULR or AIR messages. However, the subject matter described herein is not limited to querying the EIR over the S13 or S13' interface. In an alternate embodiment, the EIR may be connected to the DRA via an SS7 Gf, MAP/F or other interface. Such an embodiment allows a service provider to use an EIR with an SS7 interface without requiring that the service provider add a Diameter interface to the EIR. FIG. 6 illustrates such an embodiment. In FIG. 6, step 1, DRA 100 receives a ULR or AIR message from SGSN 102. In response to the ULR or AIR message, in step 2, DRA 100 formulates an EIR query via the SS7 Gf or MAP/F interface. Such a query may be an SS7 formatted query sent over a Sigtran or TDM-based SS7 signaling link. The EIR query may include the IMEI and optionally, the IMSI. In step 3, DRA 100 receives a response from EIR 108. In this example, the response indicates that the device is allowed to access the network. Accordingly in step 4, DRA 100 forwards the ULR or AIR query to HSS 106. In step 5, HSS 106 response to the query with a ULA or AIA message. In step 6, DRA 100 routes the ULA or AIA message to SGSN 102.

Figure 7:
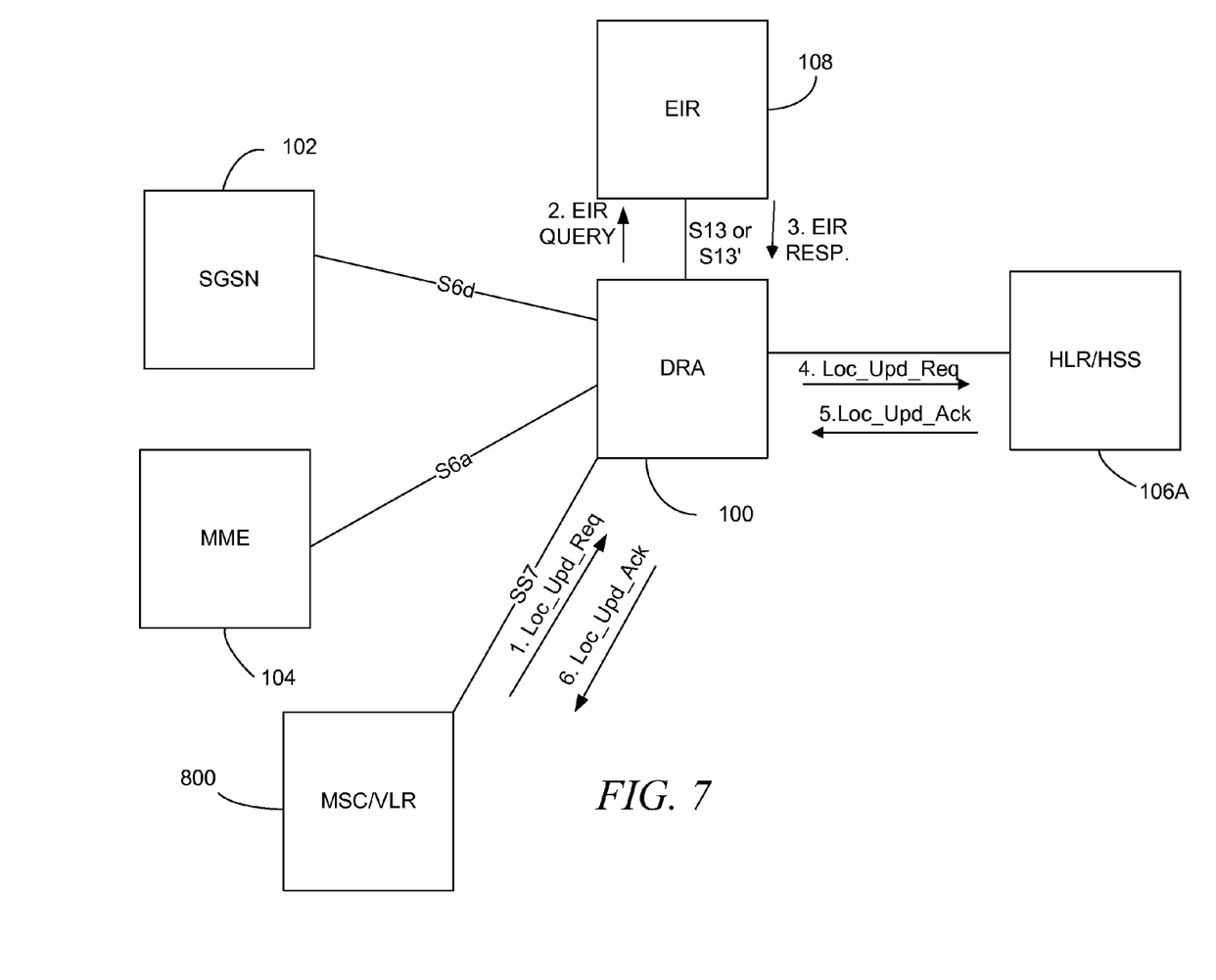
FIG. 7 is a network diagram illustrating an exemplary network architecture for using a DRA with a Diameter connected EIR to provide triggerless EIR service to SS7 and Diameter connected nodes according to an embodiment of the subject matter described herein.

In yet another alternate embodiment, triggerless EIR service for messages received via an SS7 interface may result in an EIR lookup via a Diameter connected EIR. FIG. 7 illustrates this embodiment. In FIG. 7, DRA 100 includes SS7 STP functionality and SS7-Diameter gateway functionality. STP functionality means that DRA 100 may route received SS7 signaling messages based on SS7 routing information. SS7-Diameter gateway functionality means that DRA may be capable of formulating Diameter messages based on received SS7 messages and vice versa. Referring to the message flow in FIG. 7, in step 1, DRA 100 intercepts an SS7 location update request message from MSC/VLR 700. In step 2, DRA 100 sends a Diameter query to EIR 108 via a Diameter S13 or 13' interface. In step 3, DRA 100 receives a response from EIR 108 indicating that the mobile device is permitted to access the network. Accordingly, in step 4, DRA 100 routes the location update request message to HLR/HSS 106A. In step 5, HLR/HSS 106A responds with a location update acknowledge message. In step 6, DRA 106A routes the location update acknowledge message to MSC/VLR 700.

Figure 8:
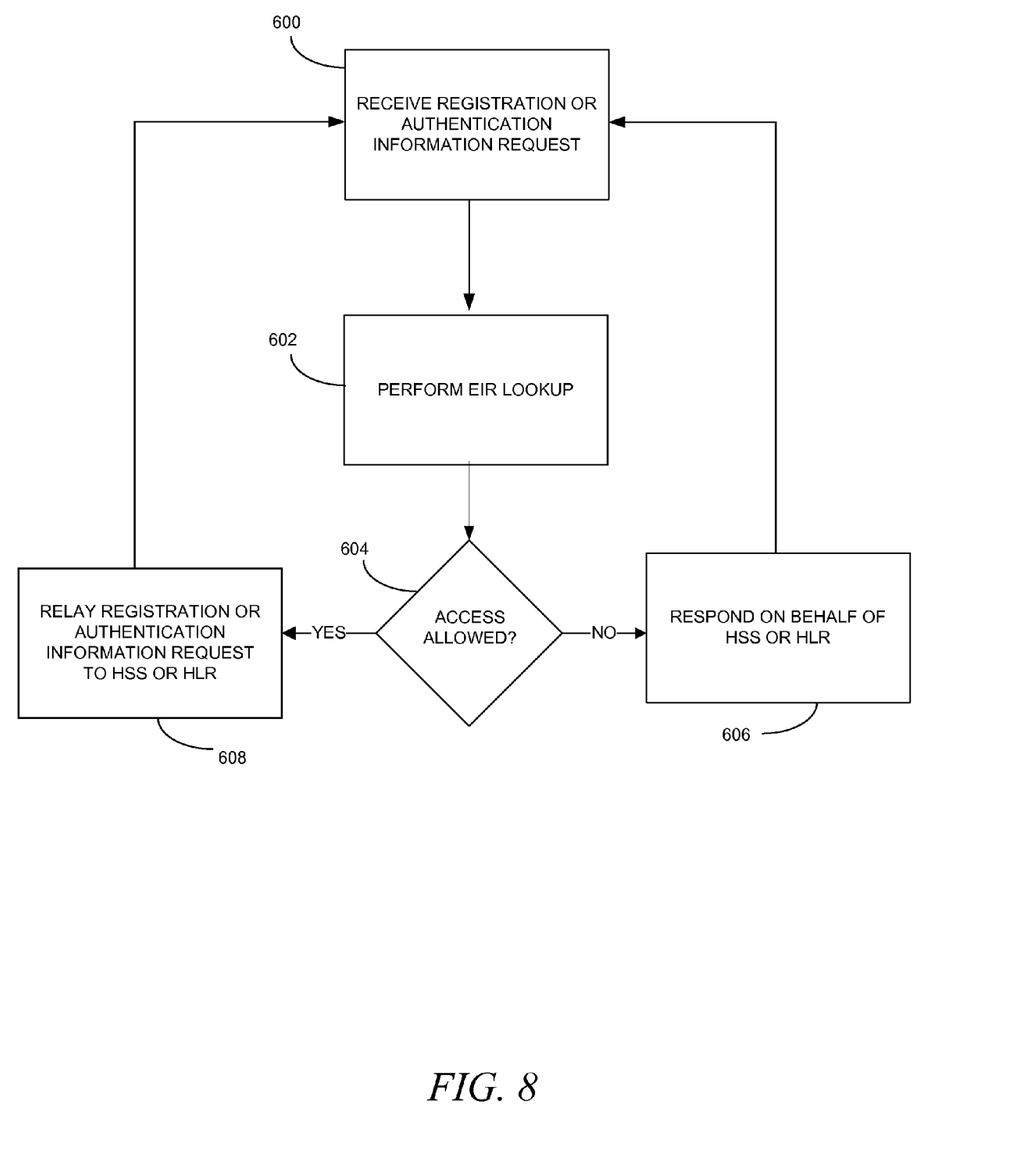
FIG. 8 is a flow chart illustrating exemplary steps for providing triggerless EIR service according to an embodiment of the subject matter described herein.

FIG. 8 is a flow chart illustrating exemplary overall steps for providing triggerless EIR service in a Diameter network according to an embodiment of the subject matter described herein. Referring to FIG. 8, in step 800, DRA 100 receives a registration or authentication information request message. For example, DRA 100 may receive a ULR or AIA message from MME 104 or SGSN 102. Alternatively, DRA 100 may receive a location update or other type of non-EIR SS7 message from MSC/VLR 700 or from SGSN 102. In steps 802 and 804, DRA 100 performs an EIR lookup based on the registration or authentication information request message and determines whether access to the network is allowed. For example, DRA 100 may perform a lookup in internal EIR database 406 or external EIR database 408 to determine whether the IMEI corresponds to allowed or denied equipment. If access is allowed, control proceeds to step 806 where the registration or authentication request message is relayed to HSS 106 or to an HLR. If access is not allowed, control proceeds to step 808 where DRA 100 responds on behalf of HSS or HLR indicating that access is not allowed.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing triggerless equipment identity register (EIR) service in a Diameter network that eliminates the need for a switching office trigger, the method comprising:
   at a Diameter routing agent (DRA) comprising a hardware processor and memory for:
   intercepting, at the DRA, a non-EIR message that is addressed to a home subscriber server (HSS), the non-EIR message comprising a Diameter Update Location Request (ULR) message or a Diameter Authentication Information Request (AIR) message;
   performing, by the DRA, an EIR lookup in an EIR database in response to intercepting the non-EIR message;
   receiving, at the DRA, an indication that access to the network is either allowed or denied;
   in response to receiving an indication that access to the network is allowed, relaying the non-EIR message to the HSS that the non-EIR message is addressed to; and
   in response to receiving an indication that access to the network is denied, formulating an Update Location Answer (ULA) message or an Authentication Information Answer (AIA) message and responding on behalf of the HSS without forwarding the non-EIR message to the HSS.

2. The method of claim 1 wherein the non-EIR message includes an international mobile equipment identifier (IMEI) and wherein the DRA performs the EIR lookup using the IMEI.

3. The method of claim 1 wherein the DRA performs the EIR lookup using the IMEI and an international mobile station identifier (IMSI).

4. The method of claim 1 wherein the EIR message does not include an international mobile equipment identifier (IMEI) and wherein the DRA maps an international mobile subscriber identity (IMSI) in the registration or authentication information request message to an IMEI.

5. The method of claim 1 wherein the EIR database is internal to the DRA.

6. The method of claim 1 wherein the EIR database is external to the DRA.

7. The method of claim 6 wherein the DRA sends a query to the EIR database via an S13 or S13' interface.

8. The method of claim 6 wherein the DRA sends a query to the EIR database via an SS7 Gf, MAP/F or other interface.

9. The method of claim 1 wherein the non-EIR message is generated at a mobility management entity (MME) or a serving GPRS support node (SGSN).

10. The method of claim 1 wherein, responding on behalf of the HSS comprises transmitting the ULA message or the AIA message to a mobility management entity (MME) or an serving GPRS support node (SGSN).

11. The method of claim 1 wherein responding on behalf of the HSS includes sending a response to the non-EIR message indicating that access to the network is denied.

12. A system for providing triggerless equipment identity register (EIR) service in a Diameter network that eliminates the need for a switching office trigger, the system comprising:
a Diameter routing agent (DRA) including:
a hardware message processor for intercepting a non-EIR message that is addressed to a home subscriber server (HSS), the non-EIR message comprising a Diameter Update Location Request (ULR) message or a Diameter Authentication Information Request (AIR) message; and
a triggerless EIR module for performing an EIR lookup in an EIR database in response to intercepting the non-EIR message, wherein the triggerless EIR module receives an indication that access to the network is either allowed or denied and, in response to receiving an indication that access to the network is allowed, the EIR module relays the non-EIR message to the HSS that the non-EIR message is addressed to, and in response to receiving an indication that access to the network is denied, the EIR module formulates an Update Location Answer (ULA) message or an Authentication Information Answer (AIA) message and responds to the non-EIR message on behalf of the HSS without forwarding the non-EIR message to the HSS.

13. The system of claim 12 wherein the non-EIR message includes an international mobile equipment identifier (IMEI) and wherein the triggerless EIR module performs the EIR lookup using the IMEI.

14. The system of claim 13 wherein the DRA performs the EIR lookup using the IMEI and an international mobile station identifier (IMSI).

15. The system of claim 12 wherein the non-EIR message does not include an international mobile equipment identifier (IMEI) and wherein the triggerless EIR module maps an international mobile subscriber identity (IMSI) in the registration or authentication information request message to an IMEI.

16. The system of claim 12 wherein the DRA includes an internal EIR database and wherein the EIR lookup is performed in the internal EIR database.

17. The system of claim 16 wherein the internal EIR database is configured to store device access information for long term evolution (LTE) devices.

18. The system of claim 12 wherein the EIR database is external to the DRA.

19. The system of claim 12 wherein the DRA sends a query to the EIR database via an S13 or S13' interface.

20. The system of claim 12 wherein the DRA sends a query to the EIR database via an SS7 Gf, MAP/F or other interface.

21. The system of claim 12 wherein the non-EIR message is generated at a mobility management entity (MME) or a serving GPRS support node (SGSN).

22. The system of claim 12 wherein responding on behalf of the HSS comprises transmitting the ULA message or the AIA message to a mobility management entity (MME) or an serving GPRS support node (SGSN).

23. The system of claim 12 wherein responding on behalf of the HSS includes sending a response to the non-EIR message indicating that access to the network is denied.

24. A non-transitory computer readable medium having executable instructions that when executed by the processor of a computer control the computer to perform steps comprising:
at a Diameter routing agent (DRA):
intercepting, at the DRA, a non-EIR message that is addressed to a home subscriber server (HSS), the non-EIR message comprising a Diameter update location request (ULR) message or a Diameter authentication information request (AIR) message;
performing, by the DRA, an EIR lookup in an EIR database in response to intercepting the non-EIR message;
receiving, at the DRA, an indication that access to the network is either allowed or denied;
in response to receiving an indication that access to the network is allowed, relaying the non-EIR message to the HSS that the non-EIR message is addressed to; and
in response to receiving an indication that access to the network is denied, formulating an Update Location Answer (ULA) message or an Authentication Information Answer (AIA) message and responding on behalf of the HSS without forwarding the non-EIR message to the HSS.

* * * * *